Figure 1:
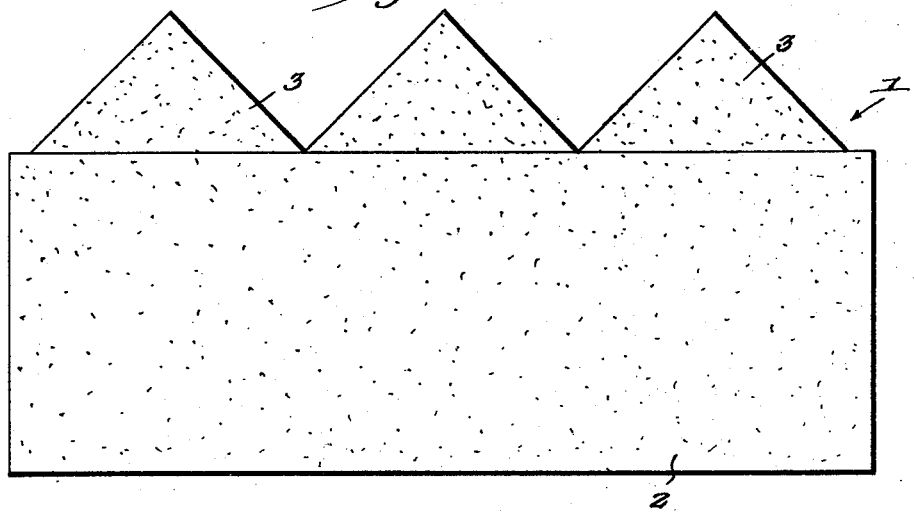
Figure 2:
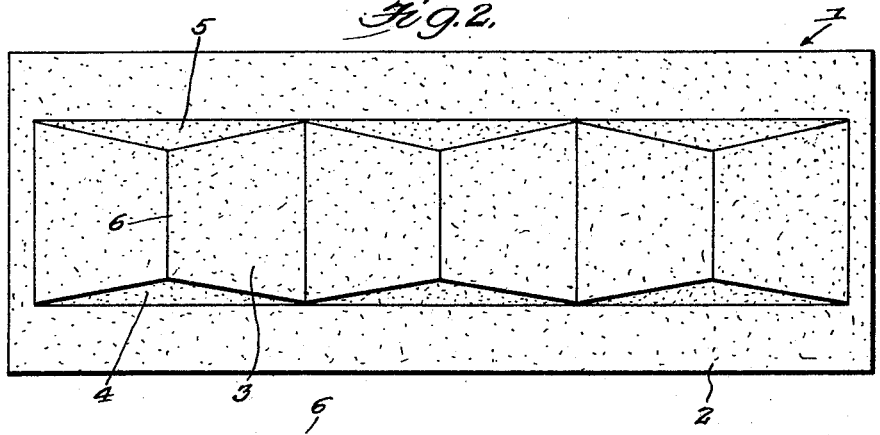
Figure 3:
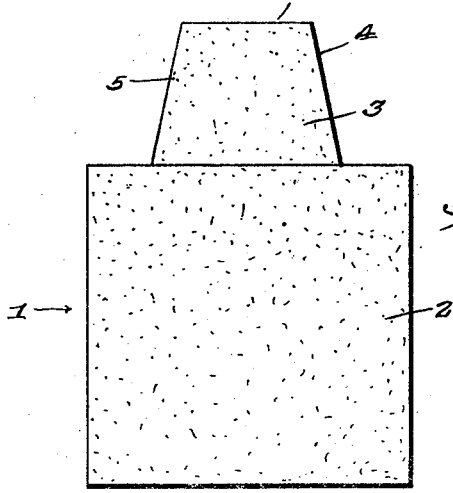

Patented June 7, 1932

1,862,245

UNITED STATES PATENT OFFICE

KENNETH E. STUART, OF NIAGARA FALLS, NEW YORK, ASSIGNOR TO HOOKER ELECTROCHEMICAL COMPANY, OF NEW YORK, N. Y., A CORPORATION OF NEW YORK

ELECTROLYTIC CELL

Application filed April 25, 1930. Serial No. 447,318.

In the operation of electrolytic cells, for instance in the electrolysis of sodium chloride for the production of caustic soda, chlorine and hydrogen, it is customary to maintain a temperature in the cell above atmospheric temperature, the heat necessary to maintain such elevated temperature being supplied as heat generated within the cell due to its internal resistance to the electrolyzing current or from an outside source or both. The heat so supplied and eventually lost by radiation and with the products of electrolysis represents a burden upon the electrolytic process which it is an object of this invention to minimize.

The invention therefore resides in a system of apparatus including an electrolytic cell and in a method of operation whereby the heat of the cell is conserved, and the amount of heat required to be supplied is minimized.

The invention is of particular value as applied to that type of electrolytic cell, in the operation of which the effluents are not returned to the cell and thus any sensible heat contained therein normally is lost and the invention therefore, resides more particularly in a system of apparatus comprising an electrolytic cell for the electrolysis of sodium chloride to produce caustic soda, chlorine, and hydrogen and in a method of operating such a system of apparatus involving the recovery of heat from one or more of the effluents of the cell and the return of this recovered heat to the cell.

The invention will be described and illustrated hereinafter by reference to a process and apparatus for the electrolysis of salt brine to the production of caustic soda, chlorine and hydrogen, it being understood that the invention embraces other similar electrolytic operations.

In accordance with my invention the electrolytic cell proper may be so designed as to conserve heat, for instance the cell may be designed to present a small exposed surface relative to the active electrode surface and the cell may be heat insulated as disclosed in my application, Ser. No. 447,319, filed concurrently herewith.

Referring to the accompanying drawing which is a diagrammatic front elevation of a bank of electrolytic cells and associated heat regenerating means, brine enters the system of apparatus at 1, flows through the vessel 2, in contact with the heat transfer element 3, by way of pipe 4 into the vessel 5 and therethrough in contact with the bank of tubes 6, thence through pipe 7, a portion of which is enclosed by the jacket 8, and by way of the distributing pipes 9 into the cells 10. Caustic soda solution formed in the cells 10 passes by way of the outlets 11, funnels 12, collecting pipes 13, and the header pipe 14 which branches into the pipe 15 leading to the jacket 8 and the by-pass pipe 16, both of which connect to the outlet 17. Hydrogen produced in the cells 10 passes by way of the collecting pipes 18, and the header pipe 19 to the vessel 5, through the bank of tubes 6 to the hydrogen outlet 20, any water separated therefrom collecting in the trap 21 and discharging through the drain 22. The chlorine generated in the cells 10 passes by way of collecting pipes 23, and the header 24 to the heat transfer element 3 and therethrough to the chlorine outlet 25, any liquid separating therefrom being collected in the trap 26 and discharged through the drain 27. As will be apparent from the foregoing description the brine entering the system cold is heated first by heat transfer with the chlorine evolved from the electrolytic cells, then further by heat transfer with the hydrogen evolved from the cells and finally by heat transfer from the caustic soda solution flowing from the cells. The amount of heat regenerated from the hydrogen and chlorine although appreciable is small and this regeneration may therefore be operated at all times at maximum efficiency. To take care of any excessive heat regeneration and overheating of the cells as may occur for instance when the electrodes become worn, provision is made for by-passing a regulatable portion of the caustic soda solution through the pipe 16 controlled by valve 28.

By conserving the heat of the cells as described they may be constructed to operate at maximum power efficiency thus mini- June 7, 1932.  G. L. TICEHURST  1,862,246

FIRE BRICK

Filed Sept. 14, 1928  2 Sheets-Sheet 1

Inventor

G.L.Ticehurst,

By Clarence A. O'Brien
Attorney